Oct. 27, 1925. 1,558,549
R. T. JOHNSTON
APPARATUS FOR SATURATING FIBROUS MATERIALS
Original Filed Feb. 17, 1921 6 Sheets-Sheet 2

Inventor:
R. T. Johnston
by Albright Brown Dunkley May
attys.

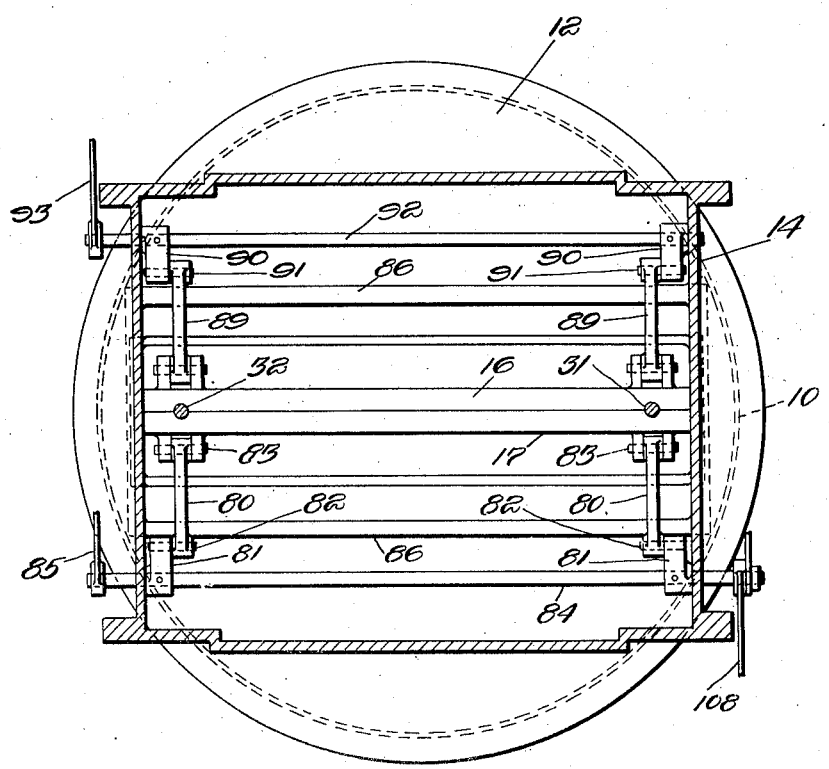
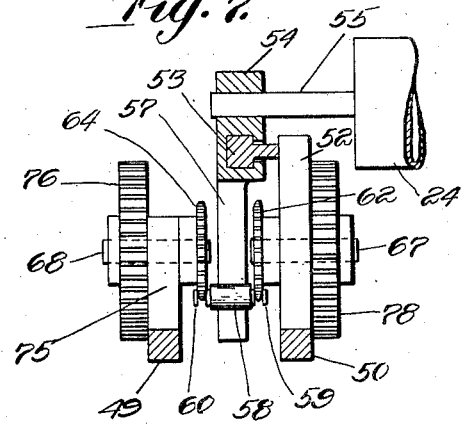

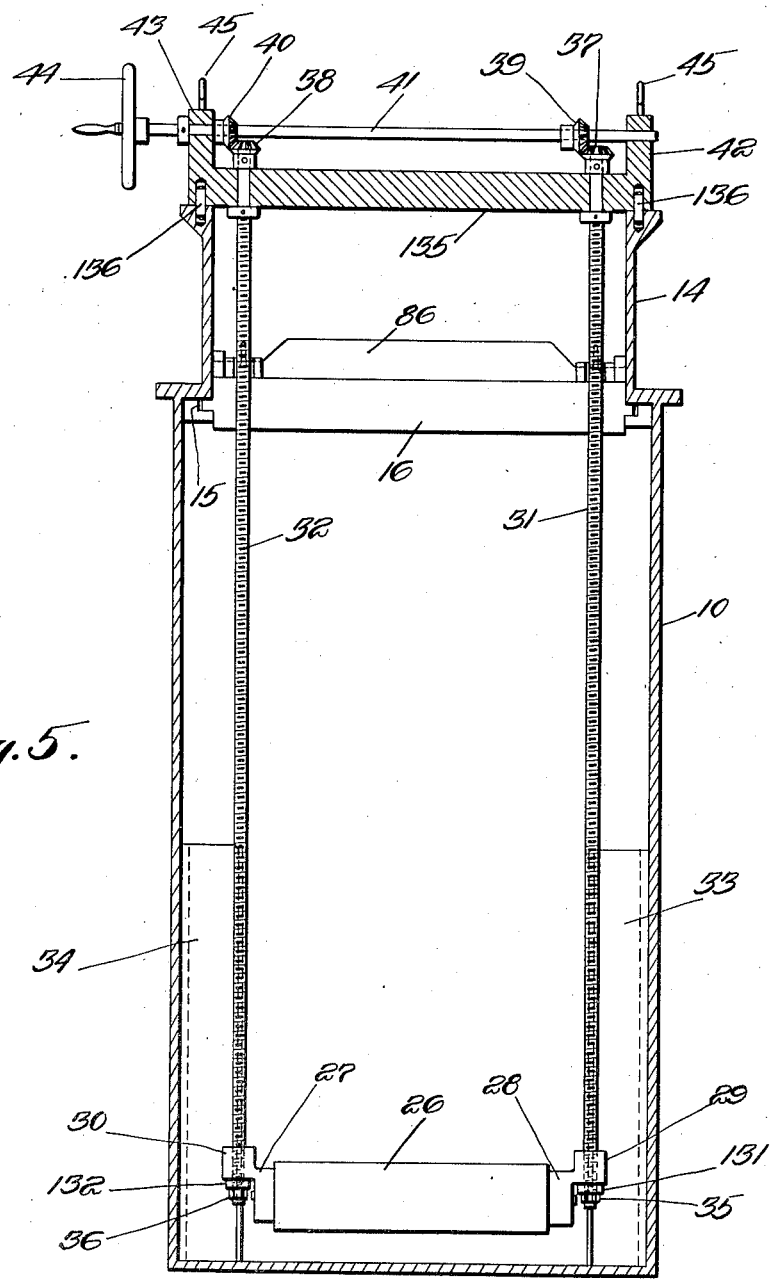

Oct. 27, 1925.
R. T. JOHNSTON
APPARATUS FOR SATURATING FIBROUS MATERIALS
Original Filed Feb. 17, 1921      6 Sheets-Sheet 6
1,558,549
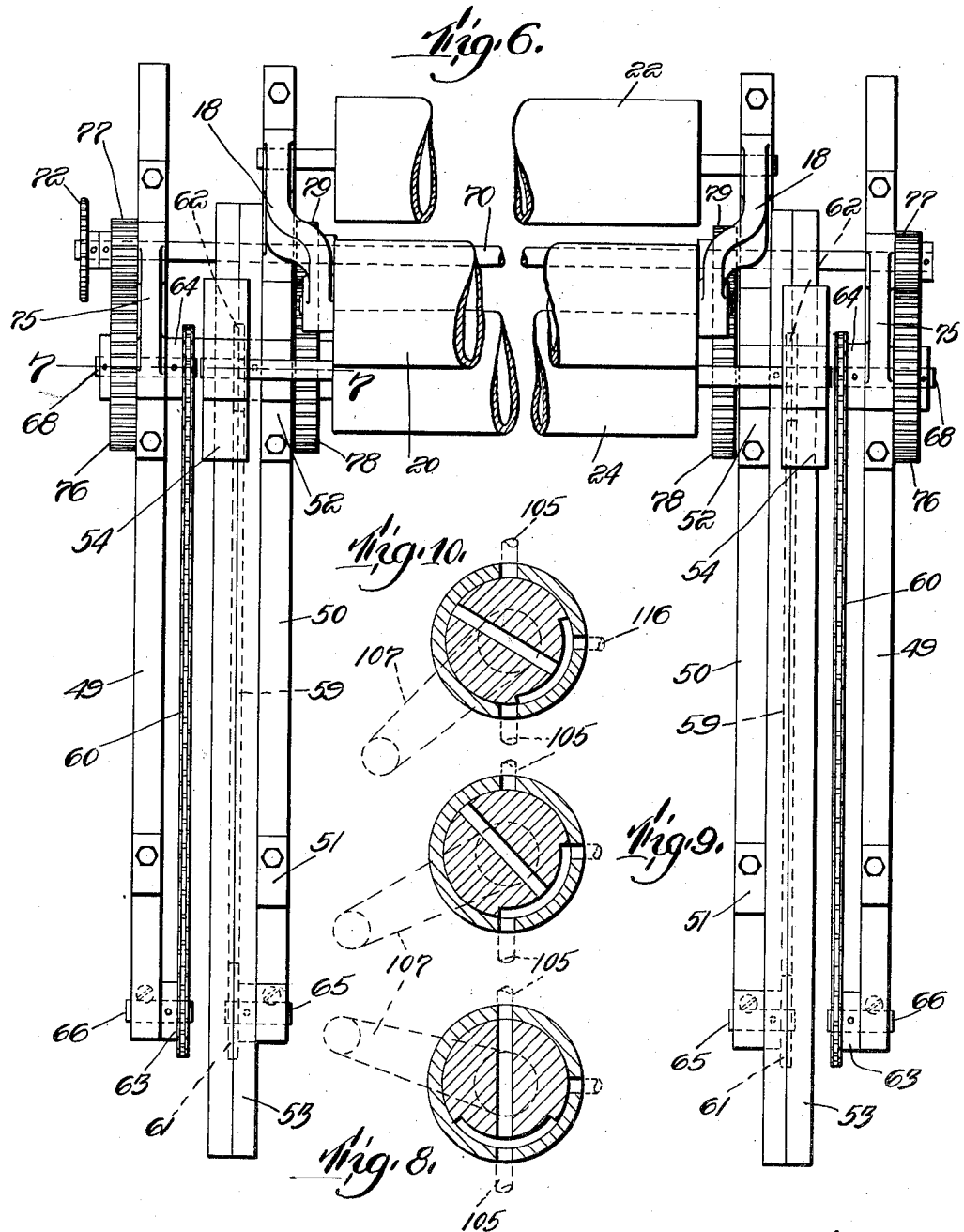

Patented Oct. 27, 1925.

1,558,549

UNITED STATES PATENT OFFICE.

ROBERT T. JOHNSTON, OF BROOKLYN, NEW YORK, ASSIGNOR TO THE FLINTKOTE COMPANY, OF BOSTON, MASSACHUSETTS, A CORPORATION OF MASSACHUSETTS.

APPARATUS FOR SATURATING FIBROUS MATERIALS.

Application filed February 17, 1921, Serial No. 445,878. Renewed March 21, 1925.

*To all whom it may concern:*

Be it known that I, ROBERT T. JOHNSTON, a citizen of the United States, residing at Brooklyn, in the county of Kings and State of New York, have invented new and useful Improvements in Apparatus for Saturating Fibrous Materials, of which the following is a specification.

This invention has relation to the saturation or impregnation of fibrous materials and relates more particularly to the impregnation of felt with asphalt or analogous tarry or bituminous compounds in the manufacture of prepared roofing. Certain problems difficult of solution have arisen in connection with the manufacture of certain forms of prepared roofing, notably in the production of individual shingles or shingle strips. It has been the usual practice in the manufacture of sheet roofing as well as in the production of shingle strips and individual shingles first to pass the sheet of felt through a bath of relatively low melting point molten asphaltic material, then to coat the saturated sheet with a layer or skin coat of higher melting point pitch or asphalt, and while the coating is in a more or less plastic condition to apply thereto an exterior layer of flaky slate, grit or other mineral material which is partially embedded therein by pressure. The sheet thus formed is subsequently cut into individual roofing units, such as shingles or strips.

One of the serious objections to the use of shingles or shingle strips is that the exposed portions thereof, when they are laid in overlapping rows, tend to curl or bend upwardly at the corners or along the lower edges. While various causes contribute to this curling of the shingles, in my opinion it is largely due to the fact that the treatment of the raw felt does not thoroughly waterproof it, or, in other words, that by the methods which have heretofore been practiced, the felt is not completely saturated with the saturating compound so that, when the edges of the individual units are exposed to moisture, the fibers absorb moisture and that the curling consequently results.

The function of the felt is to serve as a vehicle for the asphaltic or bituminous compound or in other words to serve as a skeleton frame which should be completely filled with and clothed by the asphaltic material, and also to add strength to the roofing units formed thereby, as well as to prevent the asphaltic materials from flowing when placed on the roof.

The object of the invention is to overcome the difficulties heretofore experienced in the production of prepared roofing elements by effecting a greater or more complete saturation than has hitherto been possible.

The impregnation of raw felt depends upon several factors, namely the porosity or absorbent properties of the felt, the viscosity or fluidity of the saturating compound and the speed at which the felt is carried through the bath of compound. These compounds as ordinarily employed for the purpose are solid at ordinary temperature and must be heated to a fluid condition in order that they may permeate the pores or interstices of the felt. Inasmuch as the fluidity of such compounds increases with the temperature to which they are heated, it is of course highly desirable that the compounds should be raised to a relatively high temperature. It has hitherto been the practice to maintain the bath of such saturating compounds as have been used, which have had a relatively low melting point at a temperature of approximately 350 degrees F. It has been found impracticable to use higher temperatures for the reason that it has been necessary to keep successive portions of the sheet of felt in the bath for a relatively long time in order that under atmospheric pressure they might receive or absorb the saturating compound, for if the sheet be exposed for any considerable time to an asphalt heated to a high temperature the fibers of the sheet are apt to be charred or weakened.

The further object of the present invention is to provide a method or an apparatus for saturating the raw felt with asphaltic compounds by which the compounds may be heated to higher temperatures than heretofore have been considered practical, whereby the fluidity of the saturating compound is greatly increased, and by which the period of time in which any given portion of the felt is immersed in the saturating compound may be reduced by carrying on the saturation under pressure greater than atmospheric pressure so as to force the saturating compound into the pores or interstices of this felt, so that as a result, the felt may be more completely saturated than has heretofore been possible.

A further object of the invention is to provide a method of saturating the felt under pressure by a continuous process so that a sheet of indeterminate length may be treated, and fed to and from the saturating apparatus continuously and without intermittent motion. The object in doing this is that the various instrumentalities which operate upon the saturated sheet are ordinarily so arranged that the sheet is fed thereto continuously and hence by my method and apparatus it is possible to supply the saturated felt through such instrumentalities continuously and directly.

On the accompanying drawings I have illustrated an apparatus embodying the invention which may be utilized in carrying out my process of saturating or impregnating roofing felt or other fibrous materials with a suitable saturating compound.

Referring to the drawings

Fig. 4 represents a horizontal section on the line 4—4, Fig. 1.

Fig. 5 represents a vertical transverse section on the line 5—5, Fig. 1.

Fig. 6 illustrates on a larger scale portions of the take-up mechanism located on one portion of the machine.

Fig. 7 represents a section on the line 7—7, Fig. 6.

Figs. 8 to 10 inclusive represent the controlling valve in section.

Before proceeding to describe the apparatus which I have illustrated by the figures thus briefly referred to, I desire to have it understood that the invention is capable of various other embodiments and that the phraseology which I herein employ is for the purpose of description and not of limitation. Reference is also made to my application for patent Serial No. 445,877 filed February 17, 1921 which shows another form of apparatus designed to carry out the method of saturation utilized by the apparatus of the present application. This application so referred to contains claims to the method and also generic claims to apparatus adapted to carry out this method.

At 10 I have illustrated an upright cylindrical tank which may be made of any suitable material and in which is contained the saturating compound. The compound may be maintained at the desired temperature in this tank by any suitable heating means, it being understood that such heating elements will be employed as will be necessary to maintain the saturating compound at a uniform temperature, preferably at a temperature of about 400 degrees F.

The asphalt, by which term I mean to include any of the bituminous compounds with which it is desired to saturate the sheet, is supplied through a pipe 11 leading from a storage and superheating tank not shown. I will subsequently explain how this asphalt is delivered to the tank and is caused to circulate therethrough.

Figure 3:
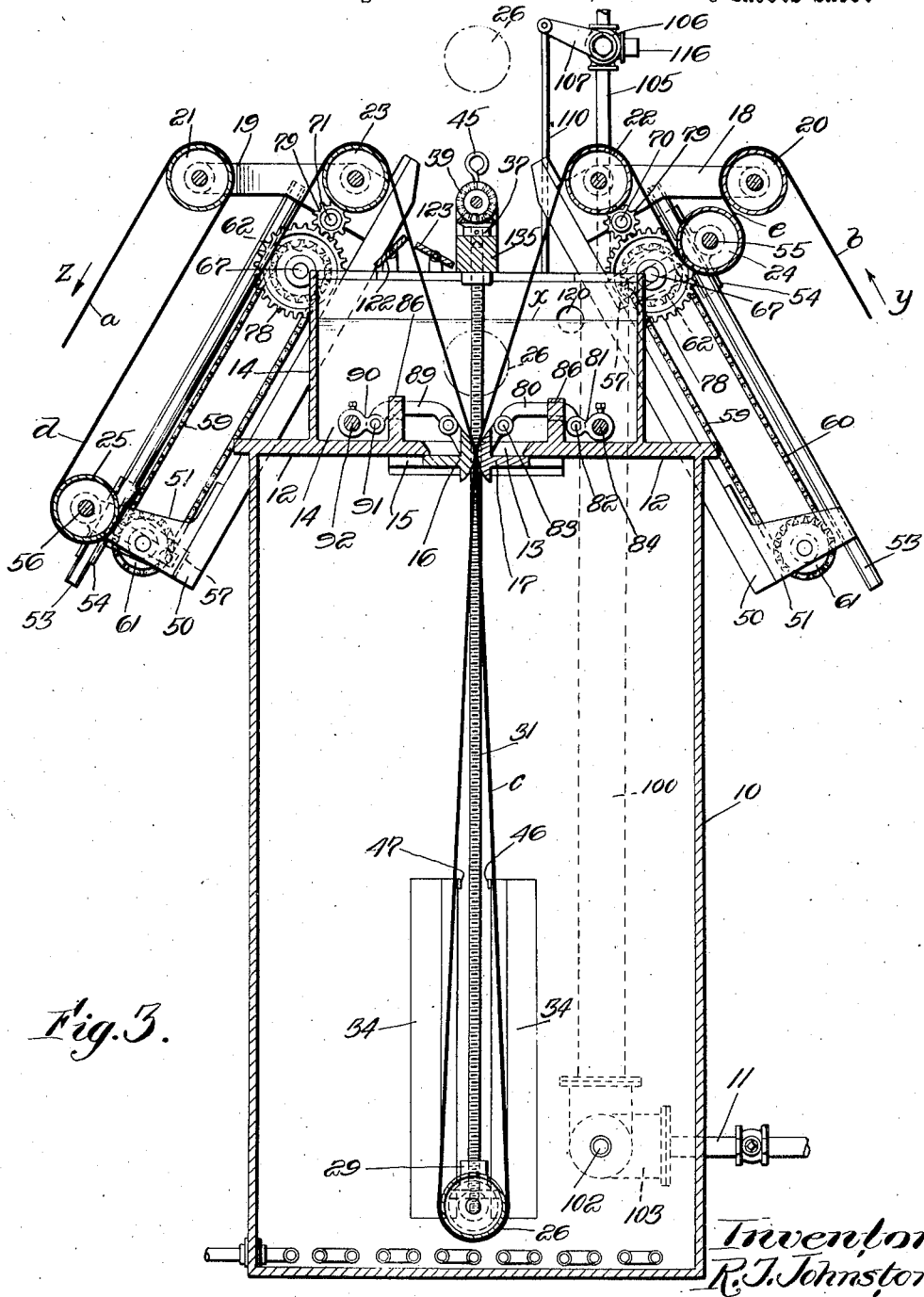
Fig. 3 represents a lateral vertical section on the line 3—3, Fig. 2.

The upper end of the tank is closed by a top wall or web 12 which forms a horizontal partition across the same, and in which there is a throat or slot 13 of sufficient width to permit a certain guide roll, to be described, to be moved through it, for threading the sheet of felt through the tank. It is sufficient at this time to state that the tank above the partition 12 is formed with a superstructure or supplemental tank 14 which may be rectangular in plan view as indicated in Fig. 4. This last mentioned supplemental tank is open at the top as best shown in Fig. 3. The slot 13, which is of a length greater than the width of any sheet of felt that may be treated in the saturating tank, affords a passage way for asphalt between the main and supplemental tanks and also affords a passage way for that portion of the sheet of felt which is undergoing immersion in the asphalt compound in the main tank.

Normally the molten asphalt fills the two tanks to the level indicated at $x$ in the supplemental tank as shown in Fig. 3 so that the throat 13 is submerged. The horizontal top wall or partition 12 of the main tank is provided on its under side and at the ends of the slot 13 with guide ways 15 in which are located two gates or valve members 16, 17 which are movable toward and from each other so as to close and open the slot 13, and also to grip between them the two bights of a loop of felt which has been passed into the main tank. When these gates or valves are closed it is possible to subject the asphalt in the tank 10 to greatly increased pressure without permitting any material escape of asphalt from the main tank into the supplemental tank 14. While one of these gates or valves is operated automatically they may both be moved manually so as to uncover the slot sufficiently to permit the movement of a guide roll, to be described, therethrough.

Journaled loosely on suitable bearing brackets 18, 19, supported by the superstructure or supplemental tank 14, are two guide rolls 20, 21, there being additional guide rolls journalled on said brackets as indicated at 22, 23. Interposed between the guide rolls 20, 22 and between the guide rolls 23 and 21 there are two take up rolls 24 and 25 respectively and these rolls and the mechanism by which they are operated to take up and release loops in the sheet of felt as it is being fed to and from the saturating tank will be subsequently explained. It is sufficient at this time to state that the sheet of felt which is travelling in the direction of the arrows *y* and *z* continuously, is passed over the roll 20, under the roll 24 and thence over the roll 22 and downwardly through the supplemental tank and through the slot 13 to an immersed guide roll indicated at 26. Thence it passes upwardly through the slot 13, over the roll 23, under the take-up roll 25 and over the guide roll 21 to the instrumentalities which subsequently operate on the saturated felt.

The immersed guide roll 26, as best shown in Figs. 3 and 5, is loosely journalled in brackets 27, 28 which are movable vertically and which are provided with nuts 29, 30 through which are passed parallel vertical screw rods 31, 32 respectively. Loosely mounted on the lower ends of the two screws below the nuts are the bars 131, 132 the ends of which are slotted to slide in guide ways 33, 34, said bars being held in place by nuts 35, 36 on the lower ends of said screw rods for a purpose to be described. The screw rods pass upwardly through the main and supplemental tanks and their upper ends are loosely journalled in a cross head 135 which rests upon and is loosely dowelled by pins 136 on the upper end of the supplemental tank 14. These two screw rods are provided with bevel gears 37 and 38 intermeshing with complemental gears 39, 40 on a cross shaft 41 which is journalled in bearings 42, 43 upstanding from the cross head 135. The shaft 41 is provided on one end with a hand wheel 44 by which it may be rotated to rotate the screws 31, 32 and raise the immersed guide roll 26 from the full line position, Fig. 3, to the intermediate position indicated by dotted lines in this same figure.

The cross head 135 is provided with eyes or hooks 45, 45 to which a tackle may be secured for raising it, the screws 31, 32, and the guide roll 26 bodily to a height to bring the guide roll 26 to the upper dotted position above the supplemental tank as shown in Fig. 3.

During this upward movement of the screw rods and the roll 26, the bars 131, 132 travel upwardly along the guide ways 33, 34 until they are stopped by stops or lugs 46, 47 at the upper ends of the guide ways, thus limiting the extent to which the screw bars and the cross head 135 may be lifted. When it is desired to thread the end of a sheet of felt through the saturating tank, the guide roll 26 is lifted to the position shown in the dotted lines above the supplemental tank and the sheet of felt is passed through from the roll 22 to the roll 23. Whereafter the cross rod 135 is dropped to its normal position in engagement with the dowels 136 and the hand wheel is thereafter rotated to depress the guide roll 26 to its normal position as shown in Fig. 5.

I have stated that a sheet of felt is fed continuously to and away from the apparatus; but successive portions or lengths of the sheet remain intermittently at rest in the main saturating tank for predetermined periods and are subjected to pressure while immersed in the saturating compound therein. In order that this may not affect the continuous feed of the remainder of the sheet, I provide take-up mechanism between the rolls 20 and 22 and the rolls 23 and 21, such take-up mechanism including the rolls 24 and 25 to which I have previously referred. The take-up roll 24 and the take-up roll 25 are shown as mounted to travel bodily in paths at an angle to each other but in any event they are so operated that as one takes up or forms a loop in the web the other lets out a previously formed loop in the web.

Secured to webs 48 formed on the front and rear side walls of the supplemental tank 14 are two spaced pairs of inclined bars 49, 50. There are four of these pairs of frame bars, the two pairs on the two sides of the supplemental tank being convergent when seen in front elevation.

The inner bar 50 of each pair of bars is provided with brackets 51, 52 to which is secured a guide bar 53 which lies parallel to the bar 50 and on which is mounted to move a sliding head 54. There are four of these slides or heads in two of which are journalled the trunnions 55 of the take-up roll 24 and in the other two of which are journalled the trunnions 56 of the take-up roll 25. Thus the two rolls 24 and 25, which are loosely journalled are adapted to slide back and forth on the guides 53, there being two guides and two slides for each of the rolls. The two slides for each roll may be considered as a carriage for the roll, when taken as a unit, and thus each carriage slides on parallel guide ways. Mechanism of course must be provided for moving these carriages back and forth on their guide ways. Any suitable mechanism may be utilized for the purpose, provided motion is so imparted to the carriages that as guide roll 24 is forming one loop, guide roll 25 is letting out another loop and vice versa, and so that the length of travel of the two carriages is the same.

I find that I may successfully utilize endless chains for moving the roll carriages. Each carriage is provided with a yoke 57 through which is passed a roll 58 carried by a pair of parallel endless sprocket chains 59, 60. Each sprocket chain 59 tracks on sprockets 61, 62. Each chain 60 tracks on like sprockets 63, 64. The sprockets 61, 63 are mounted on stud shafts 65, 66 which are journalled in brackets on the lower or outer ends of the frame bars 49, 50. The sprockets 62, 64 are secured on shafts 67, 68, which are journalled in brackets on the upper or inner ends of frame bars 49 and 50 and which are in axial alignment just as stud shafts 65, 66 are in axial alignment. By rotating the two shafts 66, 68, in each case the sprocket chains 59 and 60 for the take-up roll 24 or the take-up roll 25 as the case may be, may be operated in unison for the purpose of moving such roll up and down or lengthwise of its guideways. It will be understood that there are four of these chains for each of the said rolls, a pair of chains being located at each end of the roll for moving the slide or head in which that end of the roll is journalled. Power is applied for moving the chains, through the shafts 67, 68, which may be regarded as the immediate driving shafts for said chains.

Figure 1:
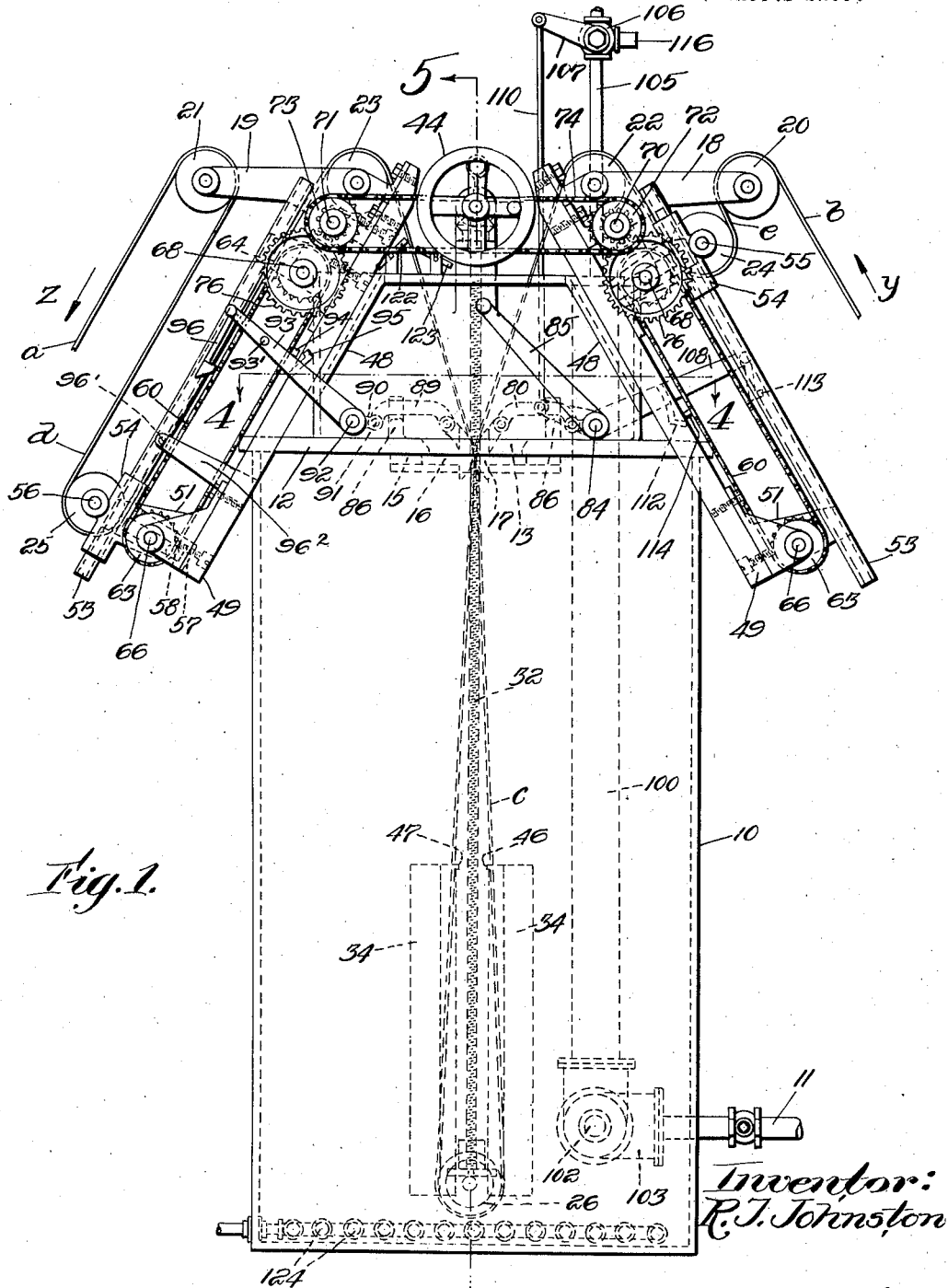
Fig. 1 represents the apparatus in side elevation.
Figure 2:
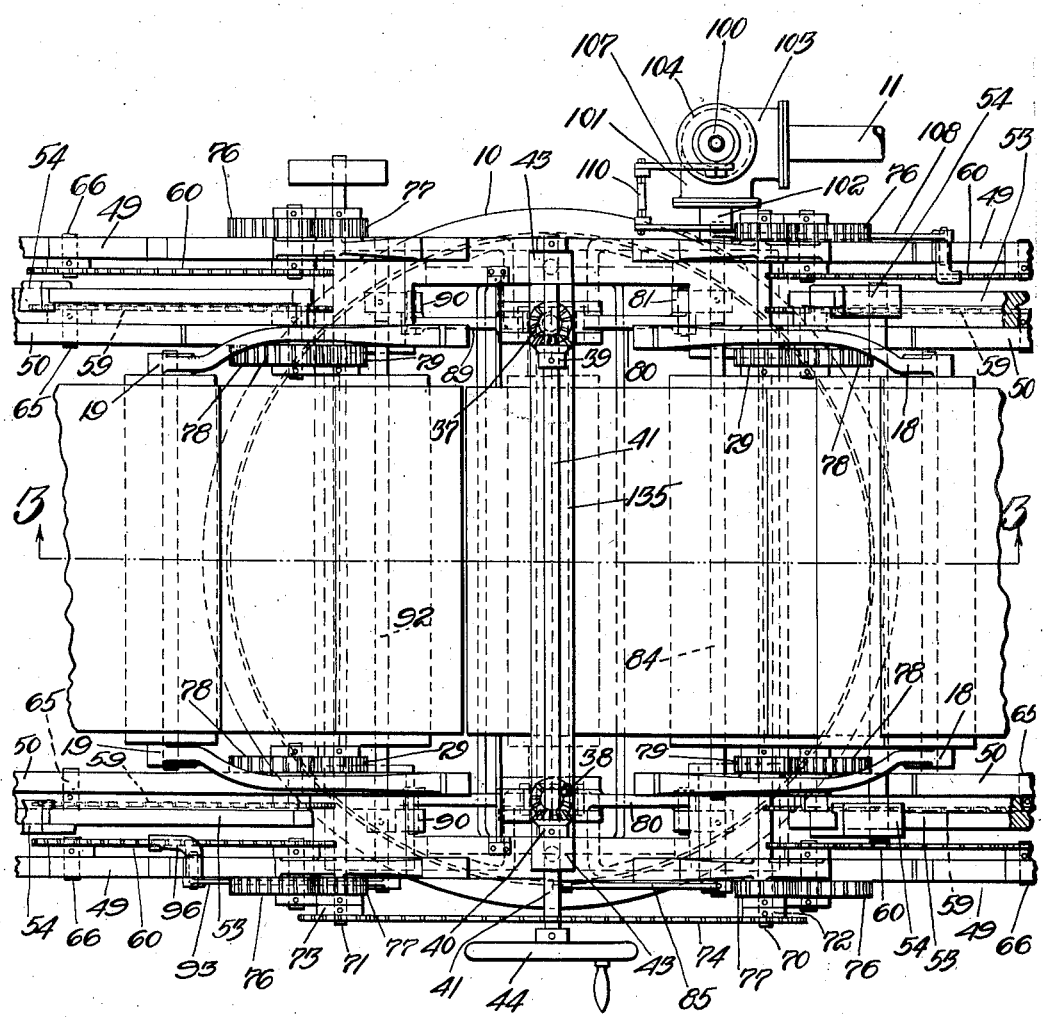
Fig. 2 represents a plan view of same.

Journalled in the brackets 18, 19 there are two shafts 70, 71 from the former of which power is transmitted to move the roll 24 and from the latter of which power is transmitted to move the roll 25. As shown in Fig. 1 these two shafts are provided with sprockets 72, 73 in which an endless sprocket chain 74 is engaged so that the two shafts may be rotated in unison in the same direction. One end of the shaft 71 as shown in Fig. 2, may be provided with a pulley to which power may be transmitted from any suitable source of power such as an electric motor, a counter-shaft or the like or from some rotating member of the next instrumentality to which the sheet is transmitted, to secure a proper timed relation between the two. For the purpose of transmitting power from the shaft 70 to the chains for moving the roll 24 or from the shaft 71 for moving the chains for take-up roll 25, the same mechanisms are employed. In each case the shaft 68 for the sprocket wheel 64, which is journalled in a bracket 75, is provided with a gear 76 intermeshing with a pinion 77 on the shaft 70 or 71 as the case may be. On the shaft 67 for each sprocket wheel 62 there is secured a gear 78 similar in size and teeth to the gear 76 and intermeshing with a pinion 79 like that at 77 and mounted on the shaft 70 or 71 as the case may be. Thus as the two shafts 70, 71 are rotated in the same direction, the four sets of chains will all be caused to travel about their sprocket wheels in the same direction so that the two pairs of the chains at the ends of the take-up rolls will cause said rolls continuously to reciprocate back and forth on their respective guide ways.

It will be recalled that the carriage, in which the roll 24 or the roll 25 is journalled, comprises the two heads or slides 54, and that each of these slides 54 is provided with a yoke 57 through which the roll 58 carried by the sprocket chains 59, 60, passes. By employing a pair of chains for each sliding head 54, I am able to effect the sliding movement thereof without imparting any torsional thrust thereto such as to cause it to bind on the guide ways.

The travel of the take-up roll carriages is so timed that the roll 25 gives up the loop just as it is needed, so as to permit a continuous movement of the felt as may be required by the next succeeding instrumentality in the manufacture of the roofing so as not to interrupt the continuous movement of the felt away from the saturating apparatus. There is, however, at the end of each back and forth movement of the carriage a short dwell as the roll 58 is passing around the pitch lines of the sprockets over which the carrying chains track. The carriages for the rolls 24, 25 and the chains which impart movement thereto are so related that, when carriage for the roll 24 reaches the upper or inner limit of its movement, the carriage for the roll 25 reaches the downward or outward limit of its movement and vice versa, and consequently, as the take-up roll 24 is forming a loop for the sheet of felt between guide rolls 20 and 22, the take up roll 25 is letting out a loop between the guide rolls 23, 21.

I have referred to the fact that the main loop of the felt, which is formed between the guide rolls 22 and 23 by the immersed roll 26, passes through the throat or slot 13 at the top of the main tank, and that this throat or slot may be closed by the gates or valves 16, 17. The parts are all so arranged and timed that by means of the take-up mechanism, which I have described, successive lengths of the sheets of felt are formed into loops in the main saturating tank 10 and come to a state of rest therein for an interval of time during which the pressure is greatly increased in the tank 10. The valves or gates 16, 17 are caused to press tightly against each other so as to compress the bights of the loop of felt against each other and thus prevent the material escape of asphalt from the tank 10 which would result in the decrease of the pressure in said tank. I provide means therefore for automatically opening and closing the valves so that between the intervals of increased pressure in the tank the length of felt which was looped and saturated may be withdrawn from the tank and a fresh length fed and looped therein. The gate valve 17 is preferably stationary except when it and the gate valve 16 may be manually moved to a withdrawn position to permit the withdrawal of the immersed guide roll 26 from the tank in the manner previously described. The valve 17 is normally held at what I may call a closed position by two toggle links 80, 81 which are pivoted together at 82. The outer end of the toggle link 80 is pivoted at 83 to a lug on the valve or gate 17. The link 81 is formed with a hub which is secured to a cross shaft 84 which on its outer end is provided with a handle 85 by which it may be rotated.

Link 80 is curved as shown and is adapted to move over a rib 86 on the top or partition 12 of the tank 10. When the valve 17 is closed the axes of the pivots 82, 83 and the shaft 84 are all in the same plane so that the parts are held in a dead centre position, thus locking the gate or valve 17 against a rearward movement when subjected to pressure. To effect the sliding movement of the valve I employ the toggles 81 at each end of the valve 17. Valve 16 may be manually moved by grasping a handle 93' on lever 93. The opposing faces of the gates or valves 16, 17 are semi-cylindrical or arcuate in form so as not to injure the felt which is compressed between them and also to offer no obstruction to a splice connecting the ends of two sheets of felt. The opposing faces of the valves are recessed to receive the screw rods 31, 32 as shown in Figs. 4 and 5.

The gate or valve 16 is automatically moved toward and from the valve 17 in timed relation to the valve mechanism which controls the increase and decrease of the internal pressure in the tank 10 and also in timed relation to the travel of the take-up roll 25, and thus of course to the take-up roll 24. The valve 16 at its ends is connected to toggles comprising the links 89, and 90 pivoted together at 91. The hub of the link 90 is secured to a rock shaft 92 which at its front end is provided with an arm or lever 93 by which it may be rocked. This arm 93 is rocked in one direction or the other automatically by one of the chains 60 which in Fig. 2 is shown at the lower left hand corner. This chain 60 is provided with an operating lug 94 projecting from the outer face thereof and adapted alternately to engage latches 95, 96 carried by the lever 93 as best shown in Fig. 1. These two latches are so arranged on different portions of the lever 93 that, when the lug or block is travelling upwardly on the lower stretch of the chain, it will engage latch 95 and swing the lever 93 upwardly or to the right to close the valve or gate 16, and, when it is travelling in the opposite direction on the outer stretch of the chain, it engages latch 96 and moves the lever in the opposite direction and thereby opens the valve 16. Latch 96 is released from lug 94 by a stationary pin 96¹ on a stationary arm 96².

The period of time, required for the lug or block 94 to travel from the point at which it has closed the valve 16 by engagement with the latch 95 on the lever 93 to the point where it opens the valve by engagement with the latch 96, is equal to the period during which the asphalt in the tank is subjected to the pressure and is also equal to the period of time required for the roll 25 to move at uniform speed from a lower to an upper position. In explanation, it will be understood that when the roll is approaching the ends of its movement its speed slackens until it stops, this being due to the fact that roll 58 on the chains 59, 60 is passing at this time through an arc of 180°, and consequently it is only during the time that the roll 58 is moving in a rectilinear path to give up the loop in the felt at the same speed at which the felt is being drawn back from the guide roll 21 that the valve 16 is closed. The time interval, which occurs between the moment when the lug 94 on the chain 60 leaves the latch 96 on the arm 93 and the moment when it engages the latch 95 and moves the lever 93 to close gate 16, is longer than the time interval elapsing between the moment that the lug 94 leaves the latch 95 and engages and operates latch 96. It is during the first mentioned interval that the loop of felt which has been saturated is fed out of the bath and a new loop or length of felt is fed thereinto.

I will now explain how the pressure is increased in the tank 10 during the time interval in which the loop of felt is submerged and quiescent therein. As shown in Figs. 2 and 3 there is a stand pipe 100 which is arranged outside of the tank 10 and which is connected thereto by an elbow 101 and a pipe 102, the last mentioned pipe entering the tank at a point relatively near the bottom thereof as shown in Fig. 1. The supply pipe 11 to which reference has previously been made as receiving asphalt from a superheating and storage tank enters an elbow 103. The upper end of the stand pipe is provided with a cap 104 into which is screwed or otherwise passed an air pipe 105 leading from an air compressor (not shown). This air pipe is provided with a valve 106 having an arm 107 by which the valve member may be operated. This valve is automatically opened and closed in timed relation to the operation of the gate or valve 16 and to the movement of the successive portions of the web in the bath of the molten asphalt in the tank 10. The valve mechanism is actuated by one of the chains which control the movement of the take-up roll 24. For this purpose a lever 108 is loosely journalled on the rear end of the shaft 84 so that it is free to swing therearound and the free end of which is connected with the free end of the lever 107 by link 110. The operating arm 108 has two latches 112 and 113 interposed in the path of movement of a lug or block 114 on the chain 60 which is located at the upper right hand corner of the machine as shown in Fig. 2. As the lug or block 114 travels around with the chain 60 the operating arm 108 is swung in one direction or the other to open or close the valve 106.

The valve 106 is preferably a three-way valve so that, when it is moved to cut off the supply of air from the compressor through the pipe 105, the air which is trapped in the stand pipe may exhaust to the atmosphere, through the valve 106. A section through this valve is shown in Figs. 8 to 10 inclusive by which it will be seen that after the air supply has been cut off from the pipe 105 some of the air is permitted to exhaust through port 116 which is open for a short time until the arm 107 reaches the lowest limit of its movement, whereupon the port 116 is closed. The exhaust of air from the stand pipe however is only momentary inasmuch as it would be undesirable to have the exhaust port open during all the time the valve is closed to cut off the air supply from the stand pipe, for the reason that the pressure on the asphalt from the superheater or reservoir into the stand pipe would cause it to rise therein and foul the valve. Normally the asphalt in the stand pipe is at the level of the asphalt in the supplemental tank 14.

Assuming that the valves 16, 17 are closed and that the air is admitted under higher pressure into the upper end of the stand pipe, the internal pressure in the tank 10 will be greatly increased so as to force the saturating material into the pores and interstices of the felt which is submerged therein.

A check valve may be located in the supply pipe 11 for the asphalt so as to prevent a back flow of the asphalt therethrough when the pressure in the stand pipe and tank is increased.

The operation of the apparatus is substantially as follows:

Let it be assumed that the portion or length of felt which is located at B and the portion or length of felt, which is indicated at A, are travelling continuously in the directions of the arrows and that the parts are all in the position shown in Fig. 1. At this time the operating lug 94 on the chain 60 at the left side of the machine as shown in Fig. 1 has just moved the lever 93 to a point where the gate or valve 16 is in a closed position and the operating lug 114 on another chain 60 has moved the operating arm 108 to a position where the air valve 106 is open to supply air from the compression chamber or pump. Under these circumstances at this time, the loop of felt, indicated at C below the gates 16 and 17 is immersed in the asphalt which is under great pressure. At this time also the take-up roll 25 at the left side of the machine is just starting on its uniform movement upwardly so as to let out the loop D in the felt in order that the length A may continue to move at a uniform speed. Also at this time the take-up roll 24 has started to move downwardly or outwardly so as to form a loop E between the take-up rolls 20 and 22. The take-up rolls 25 and 24 now move at uniform speed, the former upwardly and to the right and the latter downwardly and to the right so that the loop E is lengthened as the loop D is given up. The loop E is lengthened at the rate necessary to maintain a uniform feed of the length B of the felt over the guide roll 20. As soon as the roll 24 reaches a point at which the yoke engaging roll 58 is due to pass through an arc of 180 degrees around the axis of the sprockets 61, 63, the operating lug 114 engages the latch 113 to swing the lever 109 about its axis to move the valve lever 107 downwardly, and at the same moment the operating lug 94 on the chain 60 at the left side of the machine engages the latch 96 on the lever 93 so as to open the gate or valve 16. Thus the pressure is cut off from the tank coincidental with or immediately prior to the opening of the gate or valve 16. As the valve lever 107 moves downwardly it first cuts off the supply of air through the pipe 105 from the compression apparatus and permits a portion of the trapped air from the stand pipe to escape. The draught on the length A of the felt, as the take-up roll 25 moves slightly up and then down and then slightly back again to the position shown in Fig. 1 and as the take-up roll 24 continues its downward movement slightly further, then pauses, then moves back to the upper limit of its movement and back to the position shown in Fig. 1, is sufficient to draw a fresh length of felt down under the submerged roll 26 and to permit the saturated length which previously formed the loop C to pass out from the tank. During the time that the gates 16 and 17 are separated, those portions of the web which are located between the lengths A and B, i. e. between rolls 20 and 21, are moved rapidly and at a variable speed in counterdistinction to the continuous speed of travel of the felt over the rolls 20 and 21 during the time that the gates 16 and 17 are closed and the tank is subjected to pressure.

I have previously indicated that the asphalt may be circulated through the tank 10 and for this purpose I provide an overflow port 120 leading from the supplemental tank 14 from which a conduit, not shown, leads to the superheating and storage tank.

The several stationary mounted guide rolls 20, 22, 23, 21 may all be heated if desired. I have shown them as being hollow and it will be understood that through their journals steam may be supplied to maintain them at the desired temperature. By heating the rolls 20, 22 the felt may be initially heated and partially dried before it is introduced into the bath of asphalt and the rolls 21, 23 may be heated to prevent the asphalt from adhering thereto.

Any suitable means may be utilized to remove the excess asphalt from the surface of the sheet as it emerges from the saturating tank. I have illustrated conventionally two scraping bars 122, 123 which engage both faces of the sheet and which are located above the top of the supplemental tank 14 and at an angle to the face of the sheet as it passes between them so that the surplus asphalt scraped from the face of the sheet runs back to the supplemental tank.

It will be observed that, as the sheet of felt has successive lengths saturated under pressure, each successive length is first passed through the bath of asphalt in the supplemental tank by which it is preliminarily coated before it passes in the main or pressure saturating tank; and further it will be observed that, after it has been subjected to pressure saturation, it is again coated as it passes outward through the supplemental tank. The preliminary and final coating are accomplished under ordinary atmospheric pressure plus the hydrostatic head of the asphalt.

The scrapers 122 and 123 may however be so adjusted as to leave a skin coat of asphalt on either or both faces of the sheet of felt.

I prefer to employ as the saturating compound blown asphalt having a melting point of approximately 200° F. as I find that asphalt having this high melting point may under conditions as herein described be caused successfully to saturate and impregnate raw roofing felt. For the successful impregnation of the felt with an asphalt having such a high melting point, it is necessary that the asphalt should be heated to a temperature sufficiently high to insure a high degree of liquidity or fluidity. I am able as I have stated to maintain the temperature of the asphalt in the tank as high as 400 degrees F. If the felt were permitted to remain for any lengthy period of time in an asphalt heated to this temperature, its fibers would be injured and its strength largely destroyed. But with the apparatus as I have described it, the sheet, notwithstanding that successive lengths remain quiescent or at rest in the saturating compound intermittently, as a whole is fed through the saturating compound so rapidly that its fibers are not burned or charred. Inasmuch as the saturation takes place under pressure, successive portions of the sheet need to be submerged in the asphalt for only a very small fraction of the time which would be required if the saturation took place at atmospheric pressure, and yet a more complete saturation is obtained. By controlling the air pressure it is possible to control the extent or degree to which the felt is saturated. Thus by employing a pressure as great as 60 lbs. and by so speeding the machine that the successive lengths of the felt which form the loops C remain in the pressure tank not over three or four seconds, it is possible to secure a practically maximum saturation of the felt with an asphalt of high melting point such as has not hitherto been possible by the forms or apparatus of the processes heretofore followed.

I have shown the pressure saturating tank as being provided with a heating coil 124 to which superheated steam under high pressure may be delivered to maintain the asphalt at the desired temperature.

In the machine as illustrated the valves are submerged in the asphalt, but the take-up mechanism is located outside the tank and hence is not submerged.

What I claim is:—

1. An apparatus for saturating sheet material, comprising an upright tank for the saturating compound, a guide in the tank and guide rolls above the tank, by which a loop of said sheet material may be formed in the tank for immersion in the compound therein, and means for periodically subjecting the saturating compound in the tank to increased pressure.

2. An apparatus for saturating sheet material, comprising a tank which is closed except for a throat, means for forming a loop of sheet material in the tank through said throat, and valve mechanism located at said throat for closing the same on said sheet material.

3. An apparatus for saturating sheet material, comprising an upright tank which is closed except for a throat at the upper end thereof, means for guiding a loop of the sheet through said throat, valve mechanism located at said throat for closing the same on said sheet material, and mechanism for automatically operating said valve mechanism.

4. An apparatus for saturating sheet material, comprising an upright tank adapted to contain the saturating compound and having a restricted throat in its upper end, means in said tank for forming a loop in the sheet passed through said throat, and means for subjecting the compound in said tank to increased pressure.

5. An apparatus for saturating sheet material, comprising an upright tank adapted to contain the saturating compound and having a restricted throat in its upper end, means in said tank for forming a loop in the sheet passed through said throat, means for subjecting the compound in said tank to increased pressure, and mechanism for closing said throat to prevent escape of any material quantity of compound therethrough.

6. An apparatus for saturating sheet material, comprising an upright tank adapted to contain the saturating compound and having a restricted throat in its upper end, means in said tank for forming a loop in the sheet passed through said throat, means for subjecting the compound in said tank to increased pressure, a movable valve at said throat submerged in the compound, and mechanism for operating said valve.

7. An apparatus for saturating sheet material, comprising an upright main tank, a supplemental tank thereabove, and communicating therewith by a throat, said tanks being adapted to contain a saturating compound, means for passing a loop of the sheet through said throat into said main tank, and means for increasing the pressure in said main tank.

8. An apparatus for saturating sheet material, comprising an upright main tank, a supplemental tank thereabove, and communicating therewith by a throat, said main tank being adapted to contain a saturating compound, means for passing a loop of the sheet through said throat into said main tank, means for increasing the pressure in said main tank, and valve mechanism located at said throat to close the same when the pressure is increased.

9. An apparatus for saturating sheet material, comprising an upright main tank, a supplemental tank thereabove, and communicating therewith by a throat, said tank being adapted to contain a saturating compound, means for passing a loop of the sheet through said throat into said main tank, and timed mechanism for automatically closing said throat and increasing the pressure in said main tank, all periodically.

10. An apparatus for saturating sheet material, comprising an upright main tank, a supplemental tank thereabove, and communicating therewith by a throat, said tanks being adapted to contain a saturating compound, means for passing a loop of the sheet through said throat into said main tank, gate valves located at said throat, manually operated means for moving one of said valves, and automatic means for operating the other of said valves.

11. An apparatus for saturating sheet material, comprising an upright main tank, a supplemental tank thereabove, and communicating therewith by a throat, said tanks being adapted to contain a saturating compound, means for passing a loop of the sheet through said throat into said main tank, gate valves located at said throat for closing the same and gripping the bights of the loop, and toggles for moving said valves and holding them in closed position.

12. An apparatus for saturating sheet material, comprising an upright main tank, a supplemental tank thereabove, and communicating therewith by a throat, said tanks being adopted to contain a saturating compound, means for passing a loop of the sheet through said throat into said main tank, gate valves located at said throat for closing the same and gripping the bights of the loop, toggles for moving said valves and holding them in closed position, and means for actuating said toggles.

13. An apparatus for saturating fibrous sheet material, comprising an upright tank adapted to contain a saturating compound, a guide roll in said tank by which a loop of the sheet is formed therein, two pairs of stationary guide rolls above said tank, and take-up rolls for forming loops of the sheet between the guide rolls of each pair.

14. An apparatus for saturating fibrous sheet material, comprising an upright tank adapted to contain a saturating compound, a guide roll in said tank by which a loop of the sheet is formed therein, two pairs of stationary guide rolls above said tank, take-up rolls for forming loops of the sheet between the guide rolls of each pair, and mechanism for automatically reciprocating said take-up rolls.

15. An apparatus for saturating fibrous sheet material, comprising an upright tank adapted to contain a saturating compound and automatic mechanism outside said tank for periodically or intermittently feeding successive lengths of a sheet into said tank.

16. An apparatus for saturating fibrous sheet material, comprising an upright tank, adapted to contain the saturating compound and closed at its upper end except for a narrow throat to receive a loop, of the sheet material, a guide roll in said tank for the loop, and automatic mechanism for feeding successive lengths of the sheet into said tank.

17. An apparatus for saturating fibrous sheet material, comprising an upright tank adapted to contain the saturating compound and closed at its upper end except for a narrow throat to receive a loop, of the sheet material, a guide roll in said tank for the loop, and automatic valve mechanism for closing said throat.

18. An apparatus for saturating fibrous sheet material, comprising an upright tank adapted to contain the saturating compound and closed at its upper end except for a narrow throat to receive a loop of the sheet material, a guide roll in said tank for the loop, automatic valve mechanism for closing said throat, and automatic mechanism for subjecting the compound in the tank to increased pressure.

19. An apparatus for saturating fibrous sheet material, comprising an upright tank adapted to contain the saturating compound and closed at its upper end except for a narrow throat to receive a loop of the sheet material, a guide roll in said tank for the loop, automatic mechanism for feeding successive lengths of the sheet into said tank intermittently and bringing the same to a state of rest, and timed mechanism for closing said throats and subjecting the saturating compound to increased pressure.

20. An apparatus for saturating fibrous sheet material, comprising an upright tank adapted to contain the saturating compound and closed at its upper end except for a narrow throat to receive a loop of the sheet material, a guide roll in said tank for the loop, and automatic take-up mechanism on both sides of said tank adapted to cause the sheet to be fed intermittently into said tank and to remain periodically at rest therein.

21. An apparatus for saturating fibrous sheet material, comprising an upright tank adapted to contain the saturating compound and closed at its upper end except for a narrow throat adapted to receive a loop of the sheet material, a guide roll in said tank for the loop, a pair of stationary guide rolls on each side of said tank, a take-up roll between the guide rolls of each pair, and automatic mechanism for operating said take-up rolls to cause one to take up and the other to let out loops of the sheet.

22. An apparatus for saturating fibrous sheet material, comprising an upright tank adapted to contain the saturating compound and closed at its upper end except for a narrow throat adapted to receive a loop of the sheet material, a guide roll in said tank for the loop, a pair of stationary guide rolls on each side of said tank, a take-up roll between the guide rolls of each pair, a guide way and a carriage thereon associated with each take-up roll, and automatic mechanism for operating said carriages.

23. An apparatus for saturating fibrous sheet material, comprising an upright tank closed at its upper end except for a throat through which a loop of the sheet may be formed, a guide roll in the tank for the loop, means for increasing the pressure periodically in said tank, and mechanism for periodically feeding the sheet through said tank.

24. An apparatus for saturating fibrous sheet material, comprising an upright tank having a throat at its upper end through which the sheet may be passed for submergence in the compound in the tank, a valve for closing the throat, means for increasing the pressure in the tank, means for periodically or intermittently feeding the sheet, and timed mechanism for controlling the operation of said valve and both said means.

25. An apparatus for saturating fibrous sheet material, comprising a tank adapted to contain a saturating compound under pressure, a stand pipe communicating with said tank and having its upper end closed, means for feeding saturating compound to said stand pipe, and means for delivering fluid under pressure to the upper end of said stand pipe.

26. The combination with a tank having a guide roll therein, of take-up mechanisms on both sides of said tank, each said mechanism comprising a guide way, a carriage thereon, a take-up roll journalled on said carriage, and means for reciprocating said carriage on its guide way.

27. The combination with a tank having a guide roll therein, of take-up mechanisms on both sides of said tank, each said mechanism comprising a guide way, a carriage thereon, a take-up roll journalled on said carriage, an endless flexible member connected to said carriage, and means for imparting movement to said flexible member.

28. An apparatus for saturating sheet material, comprising a main tank, a supplemental tank thereabove and communicating therewith by a throat, said tanks being adapted to contain saturant in which said throat is submerged, means for guiding an indeterminate length of fibrous material through said supplemental tank and throat and in looped formation through said main tank, and means for subjecting the saturant in said main tank to a different pressure than that in said supplemental tank.

In testimony whereof I have affixed my signature.

ROBERT T. JOHNSTON.